United States Patent
Na et al.

(10) Patent No.: US 10,764,767 B2
(45) Date of Patent: Sep. 1, 2020

(54) CELL CONTROL DEVICE AND CELL CONTROL METHOD

(71) Applicant: SK TELECOM CO., LTD., Seoul (KR)

(72) Inventors: Min Soo Na, Seoul (KR); Chang Soon Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/753,001

(22) PCT Filed: May 20, 2016

(86) PCT No.: PCT/KR2016/005377
§ 371 (c)(1),
(2) Date: Feb. 15, 2018

(87) PCT Pub. No.: WO2017/073869
PCT Pub. Date: May 4, 2017

(65) Prior Publication Data
US 2018/0249348 A1 Aug. 30, 2018

(30) Foreign Application Priority Data
Oct. 26, 2015 (KR) .................. 10-2015-0148885

(51) Int. Cl.
*H04W 16/32* (2009.01)
*H04W 28/08* (2009.01)
*H04W 48/10* (2009.01)
*H04W 24/02* (2009.01)

(52) U.S. Cl.
CPC .......... *H04W 16/32* (2013.01); *H04W 24/02* (2013.01); *H04W 28/08* (2013.01); *H04W 48/10* (2013.01)

(58) Field of Classification Search
CPC ...... H04W 16/32; H04W 48/10; H04W 28/08
See application file for complete search history.

(56) References Cited

U.S. PATENT DOCUMENTS

| | | | |
|---|---|---|---|
| 9,380,583 B1* | 6/2016 | Joung | H04W 16/08 |
| 9,398,522 B2* | 7/2016 | Uchino | H04W 48/16 |
| 2011/0237239 A1* | 9/2011 | Chou | H04W 48/08 455/422.1 |
| 2013/0083744 A1 | 4/2013 | Peng et al. | |

(Continued)

FOREIGN PATENT DOCUMENTS

| | | |
|---|---|---|
| KR | 10-2009-0114718 A | 11/2009 |
| KR | 10-2010-0113406 A | 10/2010 |
| KR | 10-2010-0113435 A | 10/2010 |

OTHER PUBLICATIONS

International Search Report for PCT/KR2016/005377 dated Aug. 24, 2016, citing the above references.

*Primary Examiner* — Rasheed Gidado
(74) *Attorney, Agent, or Firm* — Hauptman Ham, LLP

(57) ABSTRACT

Disclosed is a cell control device and method that can improve data processing capacity and speed of each cell by removing inter-cell interference due to transmission of system information blocks (SIB), which are transmitted in a broadcast manner from cells by reducing the number of times of transmission of the system information blocks or removing the system information blocks in a wireless environment including a plurality of small cells in a macrocell.

10 Claims, 5 Drawing Sheets

(56) References Cited

U.S. PATENT DOCUMENTS

| | | | |
|---|---|---|---|
| 2013/0107866 A1* | 5/2013 | Leu | H04W 52/325 |
| | | | 370/335 |
| 2013/0188624 A1* | 7/2013 | Lee | H04W 24/02 |
| | | | 370/338 |
| 2014/0254355 A1* | 9/2014 | Soliman, Sr. | H04W 28/08 |
| | | | 370/229 |
| 2015/0045024 A1* | 2/2015 | Lunden | H04W 48/16 |
| | | | 455/434 |
| 2015/0181508 A1 | 6/2015 | Uchino et al. | |
| 2016/0080947 A1* | 3/2016 | Watanabe | H04W 16/30 |
| | | | 370/254 |

* cited by examiner

CELL CONTROL DEVICE AND CELL CONTROL METHOD

CROSS REFERENCE TO RELATED APPLICATION

This present application is a national stage filing under 35 U.S.C § 371 of PCT application number PCT/KR2016/005377 filed on May 20, 2016 which is based upon and claims the benefit of priority to Korean Patent Application No. 10-2015-0148885 filed on Oct. 26, 2015 in the Korean Intellectual Property Office. The disclosures of the above-listed applications are hereby incorporated by reference herein in their entirety.

BACKGROUND OF THE INVENTION

1. Field of the Invention

The present disclosure relates to a method for reducing transmission of the system information block (SIB) or blocking transmission of the system information block in a wireless environment where a plurality of small cells is included in a macrocell, thereby removing inter-cell interference due to transmission of system information block and improving data transmission efficiency.

2. Description of the Prior Art

As the types of communication services and the required transmission speeds are become more various in an LTE communication system, expansion of LTE frequencies and evolution toward a 5G communication system is being rapidly made.

In relation to this development, for example, HetNet has been proposed since the 5G communication system faces an explosion of data traffic.

HetNet is a technology that improves data processing capacity and speed by deploying a plurality of small cells in one macrocell.

The macrocell and the small cells transmit control signals which is necessary for the terminals to use a mobile communication service. For example, the control signals can be a system information block (SIB) and a cell-specific reference signal (CRS).

However, the control signal is transmitted from the macrocell and the small cells regardless of a cell load.

In particular, since the system information block is transmitted in a broadcast manner, it causes inter-cell interference, so the data processing capacity and speed of the cells may be reduced.

Accordingly, it is required to minimize inter-cell interference caused by a system information block transmitted in a broadcast manner in order to improve data processing capacity and speed in a wireless environment where HetNet is applied.

SUMMARY OF THE INVENTION

The present disclosure has been made in this situation and an aspect of the present disclosure is to remove inter-cell interference due to transmission of system information blocks (SIB) for improving data transmission efficiency in a wireless environment including a plurality of small cells in a macrocell. To this end, an aspect of the present disclosure reduces or blocks transmission of control signal such as such as the system information block, which is to be periodically transmitted in a broadcast manner regardless of existence or not of a terminal and the number of terminal in a cell coverage.

In accordance with an aspect of the present disclosure, there is provided a cell control device including: a determiner configured to determine the number of terminal connected to a macrocell in a wireless environment including a plurality of small cells in the macrocell; and a controller configured to block transmission of system information block from each of the plurality of small cells and allow transmission of system information block from the macrocell in a broadcast manner when the number of terminal is less than a threshold value, and to allow transmission of system information block from each of the plurality of small cells and the macrocell in a broadcast manner when the number of terminal is the threshold value or more.

Specifically, the controller may be configured to, when it is determined that there is a need to handover the terminal connected to the macrocell to a specific small cell, allow transmission of system information block related to the specific small cell from the macrocell in a unicast manner thereby the terminal receiving the system information block being able to handover to the specific small cell.

Specifically, the controller may be configured to determine there is a need to handover to the specific small cell, when at least one of a downlink load and an uplink load of the macrocell exceeds a threshold value and reference signal received power of the specific small cell reported from the terminal exceeds a threshold value.

Specifically, the system information block transmitted in a unicast manner may include control information for connection to the specific small cell.

Specifically, wherein the system information block transmitted in a unicast manner may be transmitted through an RRC (Radio Resource Control) message including an RRC connection reconfiguration message.

In accordance with another aspect of the present disclosure, there is provided a cell control method including: determining the number of terminal connected to a macrocell in a wireless environment including a plurality of small cells in the macrocell; and controlling to block transmission of system information block from each of the plurality of small cells and allow transmission of system information block from the macrocell in a broadcast manner when the number of terminal is less than a threshold value, and to allow transmission of system information block from each of the plurality of small cells and the macrocell in a broadcast manner when the number of terminal is the threshold value or more.

Specifically, the operation of controlling may comprise, when it is determined that there is a need to handover the terminal connected to the macrocell to a specific small cell, allowing transmission of system information block related to the specific small cell from the macrocell in a unicast manner thereby the terminal receiving the system information block being able to handover to the specific small cell.

Specifically, it may be determined there is a need to handover to the specific small cell, when at least one of a downlink load and an uplink load of the macrocell exceeds a threshold value and reference signal received power of the specific small cell reported from the terminal exceeds a threshold value.

Specifically, the system information block transmitted in a unicast manner may include control information for connection to the specific small cell.

Specifically, wherein the system information block transmitted in a unicast manner may be transmitted through a radio resource control (RRC) message including an RRC connection reconfiguration message.

According to the cell control device and method of the present disclosure, transmission of the system information block can be reduced or blocked in a wireless environment where a plurality of small cells is included in a macrocell, thereby removing inter-cell interference due to transmission of system information block and improving data transmission efficiency.

DETAILED DESCRIPTION OF THE EXEMPLARY EMBODIMENTS

Hereinafter, an embodiment of the present disclosure will be described with reference to accompanying drawings.

Figure 1:
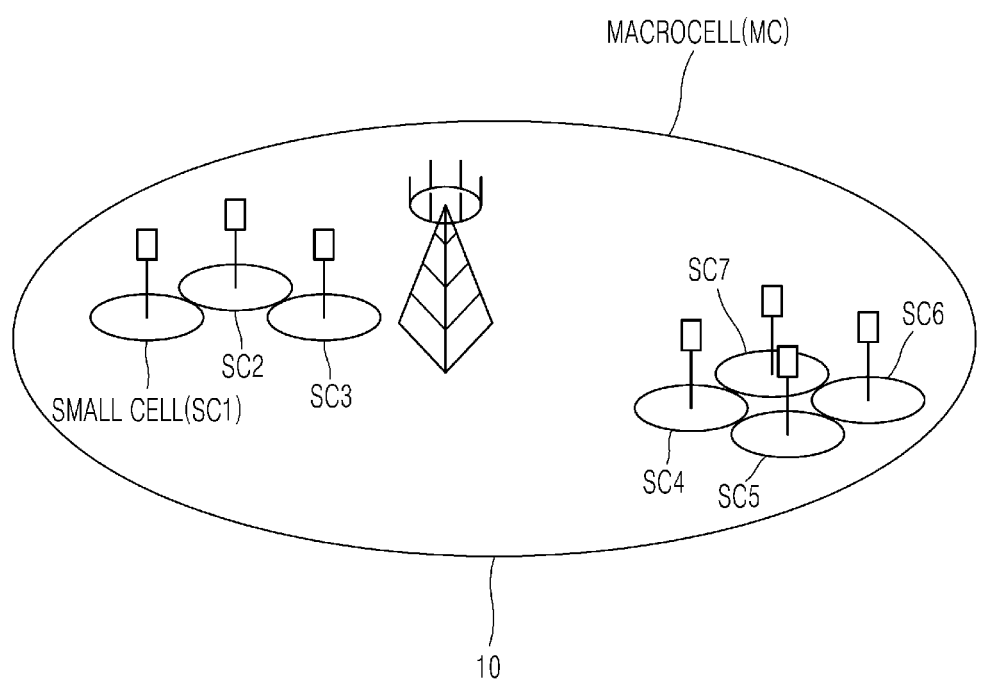
FIG. 1 is an exemplary diagram of showing a wireless environment according to an embodiment of the present disclosure.

FIG. 1 shows a wireless environment according to an embodiment of the present disclosure.

As shown in FIG. 1, a wireless environment according to an embodiment of the present disclosure includes a plurality of small cells SC1, SC2, SC3, SC4, SC5, SC6, and SC7 in a macrocell MC. For example, HetNet is applied as key technology for the 5G communication system is applied.

A cell control device 10 is a base station device that provides a mobile communication service to terminals in the macrocell MC, which generally has coverage of around several kilometers.

The cell control device 10, for example, may be a NodeB or an eNodeB.

Further, the terminal UE #0 may refer to a mobile or fixed user node such as user equipment (UE) or a mobile station (MS).

In general, the small cells SC1, SC2, SC3, SC4, SC5, SC6, and SC7 may have coverage of tens of meters in the coverage of the macrocell MC.

The small cells may be, for example, femto cells, pico cells, home node Bs, and home EnBs.

As described in the background art, the cells in the above-described wireless environment transmit control signal regardless of a cell load. The control signal is necessary for the terminals to use a mobile communication service. For example, the control signal is a system information block (SIB) and a cell-specific reference signal (CRS).

In particular, the system information blocks are transmitted from the cells in a broadcast manner and may be the main factors that cause inter-cell interference.

Meanwhile, the terminals in the cells can obtain various parameters from system information received from the corresponding cells. For example, the various parameters can be parameters for initiating or call connecting after the power of the terminal is turned on.

The system information may be composed of a master information block (MIB) and a plurality of system information blocks (SIB) described above.

For example, the mater information block may include scheduling information related to the system information blocks.

The system information blocks may be divided into an SIB1 transmitted through a 'SystemInformationBlockType 1 (SIB #1)' message, and an SIB2 to SIB11 transmitted through a 'SystemInformation (SI)' message.

For reference, the following Table 1 shows definitions of the master information block and the system information blocks constituting the system information.

TABLE 1

| System information blocks | Description |
| --- | --- |
| MIB | Carries physical layer information of LTE cell which in turn help receive further SIs, i.e. system bandwidth |
| SIB1 | Contains information regarding whether or not UE is allowed to access the LTE cell. It also defines the scheduling of the other SIBs. carries cell ID, MCC, MNC, TAC, SIB mapping. |
| SIB2 | Carries common channel as well as shared channel information. It also carries RRC, uplink power control, preamble power ramping, uplink Cyclic Prefix Length, sub-frame hopping, uplink EARFCN |
| SIB3 | Carries cell re-selection information as well as Intra frequency cell re-selection information |
| SIB4 | Carries Intra Frequency Neighbors(on same frequency); carries serving cell and neighbor cell frequencies required for cell reselection as well handover between same RAT base stations(GSM BTS1 to GSM BTS2) and different RAT base stations(GSM to WCDMA or GSM to LTE or between WCDMA to LTE etc.). Covers E-UTRA and other RATs as mentioned |
| SIB5 | Carries Inter Frequency Neighbors(on different frequency); carries E-UTRA LTE frequencies, other neighbor cell frequencies from other RATs. The purpose is cell reselection and handover. |
| SIB6 | Carries WCDMA neighbors information i.e. carries serving UTRA and neighbor cell frequencies useful for cell re-selection |
| SIB7 | Carries GSM neighbours information i.e. Carries GERAN frequencies as well as GERAN neighbor cell frequencies. It is used for cell re-selection as well as handover purpose. |
| SIB8 | Carries CDMA-2000 EVDO frequencies, CDMA-2000 neighbor cell frequencies. |
| SIB9 | Carries HNBID (Home eNodeB Identifier) |
| SIB10 | Carries ETWS prim. notification |
| SIB11 | Carries ETWS sec. notification |

A Broadcast channel (BCH) is used as a transmission channel for transmitting the system information, and a physical broadcasting channel (PBCH) and a physical downlink shared channel (PDSCH) may be used as physical channels, respectively.

The master information block is broadcasted through the PBCH and the system information blocks are broadcasted through a radio resource control (RRC) message using the PDSCH.

Figure 2:
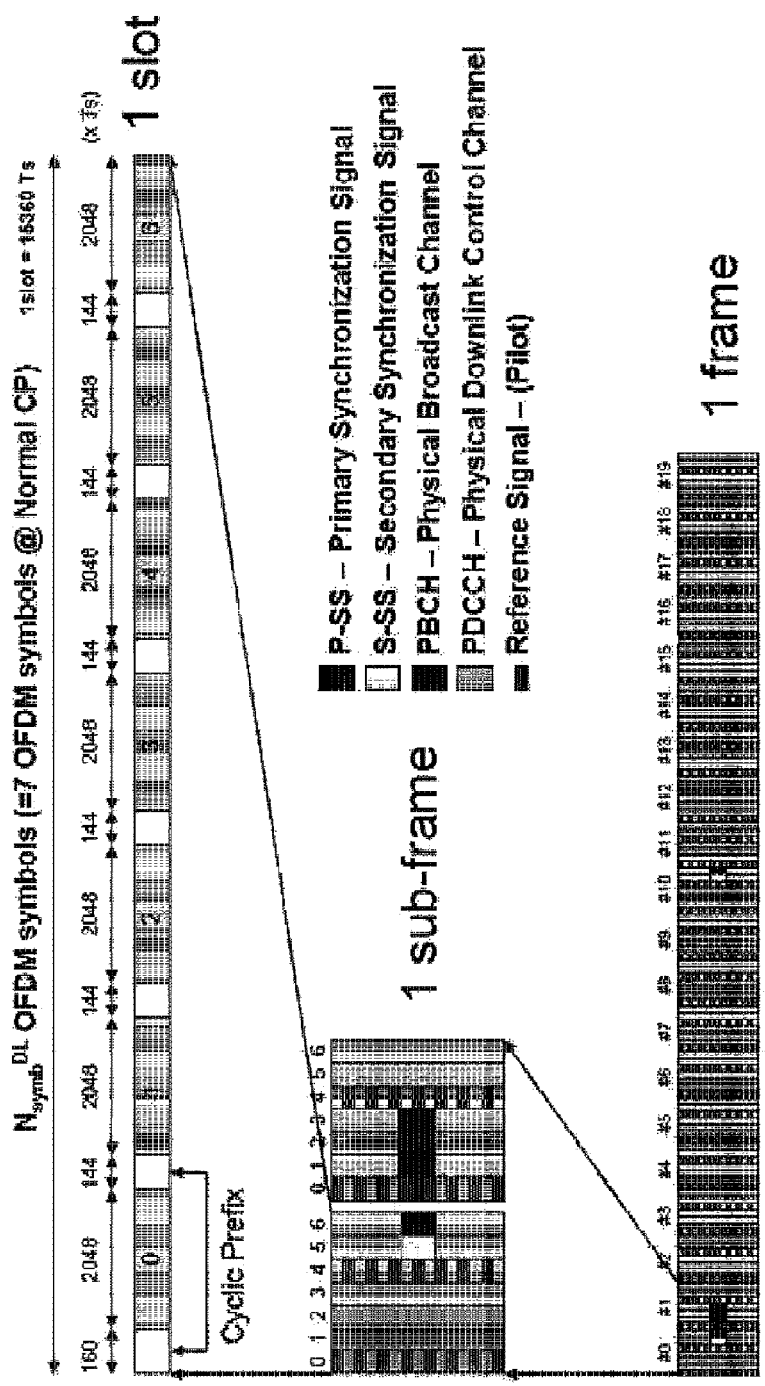
FIG. 2 is a diagram showing a radio frame structure related to a PBCH through which a master information block is transmitted and a PDSCH through which a system information block is transmitted, according to an embodiment of the present disclosure.

For reference, FIG. 2 shows a radio frame structure associated with the PBCH for transmitting the master information block and the PDSCH for transmitting the system information blocks.

The terminal in each cell can receive master information block through the PBCH, and receive system information blocks through the PBSCH using the information included in the master information block.

However, the PDSCH is used to transmit not only system information blocks but also other signals and data transmitted from various channels such as a physical channel (PCH) or a downlink shared channel (DLSCH).

Accordingly, it is possible that the system information blocks transmitted through the PDSCH can influence other traffic transmitted through the PDSCH.

Further, when the system information blocks is periodically broadcast irrelevant to a cell load as described above, inter-cell interference can increase.

Accordingly, an embodiment of the present disclosure is intended to provide a measure that can reduce inter-cell interference by reducing/blocking transmission of the system information block that is to be transmitted in a broadcast manner from the cells. The configuration of a cell control device 10 for implementing the measure is described in detail hereafter.

Figure 3:
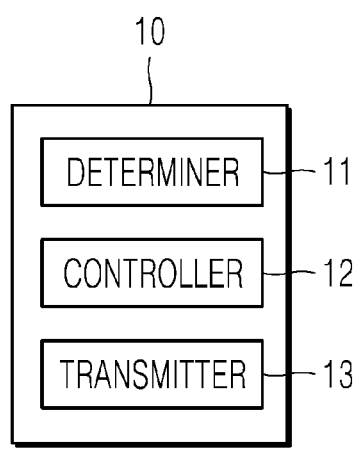
FIG. 3 is a diagram illustrating the configuration of a cell control device according to an embodiment of the present disclosure.

FIG. 3 is a block diagram illustrating the configuration the cell control device 10 according to an embodiment of the present disclosure.

As shown in FIG. 3, the cell control device 10 according to an embodiment of the present disclosure may include a determiner 11 configured to determine the number of terminal, a controller 12 configured to control transmission of system information block, and a transmitter 13 configured to transmit system information block.

The entire or at least a portion of the configuration of the cell control device 10 including the determiner 11, controller 12, and transmitter 13 can be implemented into a software module or a hardware module, or a combination of a software module and a hardware module.

The cell control device 10 according to an embodiment of the present disclosure can remove inter-cell interference by reducing or blocking transmission of system information block that is to be transmitted from cells in a broadcast manner using the components thereof. The components of the cell control device 10 for this purpose are described in detail hereafter.

Before the components of the cell control device 10 are described in detail, it is assumed that the small cells SC1, SC2, SC3, SC4, SC5, SC6, and SC7 transmit a primary synchronization signal (PSS) and a secondary synchronization signal (SSS) so that terminal receiving the signals can be synchronized.

For example, the PSS may be used for the terminal to obtain symbol synchronization or slot synchronization and the SSS may be used for the terminal to obtain frame synchronization.

For reference, the terminal can extract cell IDs from the PSS/SSS in the process of initial cell connection.

Further, the terminal can receive reference signal (for example, a CRS) for PBCH demodulation using the extracted cell IDs so that the terminal can receive a master information block through the PBCH. In addition, the terminal can receive system information block through the PDSCH using the information in the master information block.

Further, it is assumed that the cell control device 10 continuously broadcasts the system information block in the macrocell MC regardless of the operations of the components to be described hereafter.

The determiner 11 performs a function of determining the number of terminal.

Specifically, the determiner 11 is configured to determine the number of terminal connected to the macrocell MC.

It is possible to determine the number of connected terminal on the basis of the number of currently connected wireless bearers in the macrocell MC.

The number of terminal determined as being connected to the macrocell MC can be used to selectively control whether the small cells SC1, SC2, SC3, SC4, SC5, SC6, and SC7 transmit a system information block.

The determiner 11 determines whether the number of terminal connected to the macrocell MC exceeds a threshold value (for example, 40).

The threshold value (for example, 40) is related to the transmission periods of system information blocks. For example, the threshold value may be related to the transmission period (for example, 40 ms) of the SIB #1 message. But it is not limited thereto and may be defined as various values on the basis of other parameters associated with the system information block.

The controller 12 performs a function of controlling transmission of system information block from the macrocell and the small cells.

Specifically, the controller 12 is configured to, when the number of terminal connected to the macrocell MC is determined, control transmission of system information block from the macrocell MC and the small cells SC1, SC2, SC3, SC4, SC5, SC6, and SC7 on the basis of the determined number of terminal.

When the number of terminal connected to the macrocell MC is determined as being less than the threshold value (for example, 40), the controller 12 controls the transmitter 13 to transmit a system information block to the macrocell MC in a broadcast manner.

In this process, the controller 12 controls the small cells SC1, SC2, SC3, SC4, SC5, SC6, and SC7 not to transmit a system information block, thereby minimizing power consumption and inter-cell interference that may be generated by transmission of a system information block.

On the contrary, when the number of terminal connected to the macrocell MC is determined as being the threshold value (for example, 40) or more, the controller 12 controls the transmitter 13 to transmit a system information block to the macrocell MC and also controls the small cells SC1, SC2, SC3, SC4, SC5, SC6, and SC7 to transmit a system information block in a broadcast manner.

When the number of terminal connected to the macrocell MC is less than the threshold value (for example, 40), the number of terminal connected to the macrocell MC is small.

In this case, if system information block is transmitted in a broadcast manner from not only the macrocell MC but also the small cells SC1, SC2, SC3, SC4, SC5, SC6, and SC7 transmit, the frequency efficiency may be considerably decreased and inter-cell interference and power consumption of the small cells SC1, SC2, SC3, SC4, SC5, SC6, and SC7 may be increased.

Accordingly, the controller 12 controls to transmit system information blocks in a broadcast manner from the macrocell MC and the small cells SC1, SC2, SC3, SC4, SC5, SC6, and SC7 only when a sufficient number of terminal is connected to the macrocell MC. By this, frequency efficiency can be maintained.

Further, the controller 12 performs a function of controlling handover of terminal connected to the macrocell MC.

Specifically, a terminal connected to the macrocell MC needs to handover to a specific small cell when the wireless environment deteriorated or a traffic load is over a threshold value. In this case, the controller 12 controls the transmitter 13 to transmit a system information block related to the specific small cell from the macrocell MC in a unicast manner, so that the terminal receiving the system information block can handover to the specific small cell.

For example, when at least one of the downlink load and the uplink load of the macrocell MC exceeds threshold value and the reference signal received power (for example, RSRP/RSRQ) of the specific small cell reported from a terminal connected to the macrocell MC exceeds threshold value, the controller 12 can determine that there is a need to handover to the specific small cell.

For example, when at least one of the downlink load or the uplink load of the macrocell MC exceeds threshold value, the controller 12 may allow terminal connected to the macrocell MC to handover to the specific small cell in order to distribute the load on the macrocell MC.

When the reference signal received power (RSRP) at the small cells SC1, SC2, SC3, SC4, SC5, SC6, and SC7 is reported from terminals connected to the macrocell MC, the specific small cell having a reference signal received power exceeds threshold value may be identified. In this case, a system information block related to the specific small cell is transmitted in a unicast manner to the terminal connected to the macrocell MC and the terminal connected to the macrocell MC handovers to the specific small cell in order to provide a good wireless environment.

The system information block transmitted in a unicast manner is transmitted through a radio resource control (RRC) connection reconfiguration message. Control information (connection information) associated with connection to the specific small cell can be included in the system information block.

The information may be a handover request message that is transmitted to terminal from a macrocell in a case of handover between frequencies.

When the number of terminal exceeds the threshold value, there is a need for initial connection to a small cell. In this case, the small cell broadcasts a system information block, so that terminals can be initially connected to not only the macrocell but the small cell.

Therefore, according to the operation of the controller 12, when a small number of terminal is connected to the macrocell MC, system information block is not transmitted from the small cells SC1, SC2, SC3, SC4, SC5, SC6, and SC7. Therefore inter-cell interference and power consumption can be minimized during the non-transmission state where the small cells SC1, SC2, SC3, SC4, SC5, SC6, and SC7 do not transmit a system information block.

Figure 4:
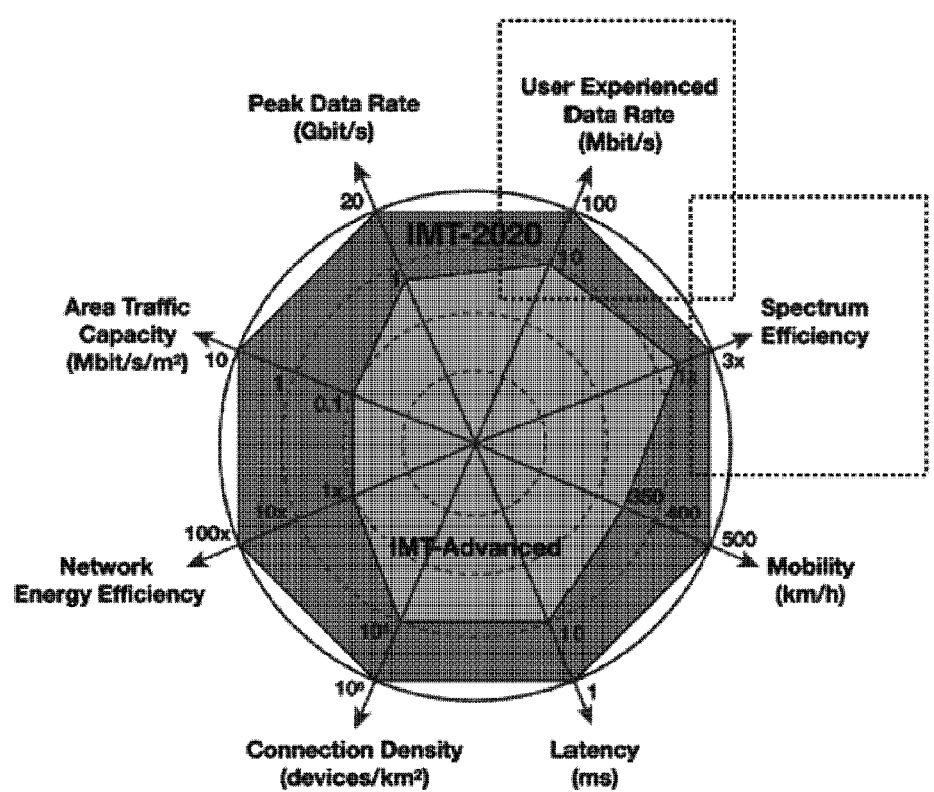
FIG. 4 is a diagram showing communication performance required for a next generation (5G) communication system according to an embodiment of the present disclosure.

For reference, when inter-cell interference is removed, data processing capacity and speed of each cell can be improved, so it can be expected that it is possible to satisfy 'User Experienced Data Rate' and 'Spectral Efficiency' of key capabilities required for a 5G next generation communication system shown in FIG. 4.

As described above, according to the cell control device 10 according to an embodiment of the present disclosure, it is possible to reduce or block transmission of the system information block (SIB) in a wireless environment where a plurality of small cells SC1, SC2, SC3, SC4, SC5, SC6, and SC7 is included in the macrocell MC, thereby removing inter-cell interference due to transmission of system information and improving data transmission efficiency.

Figure 5:
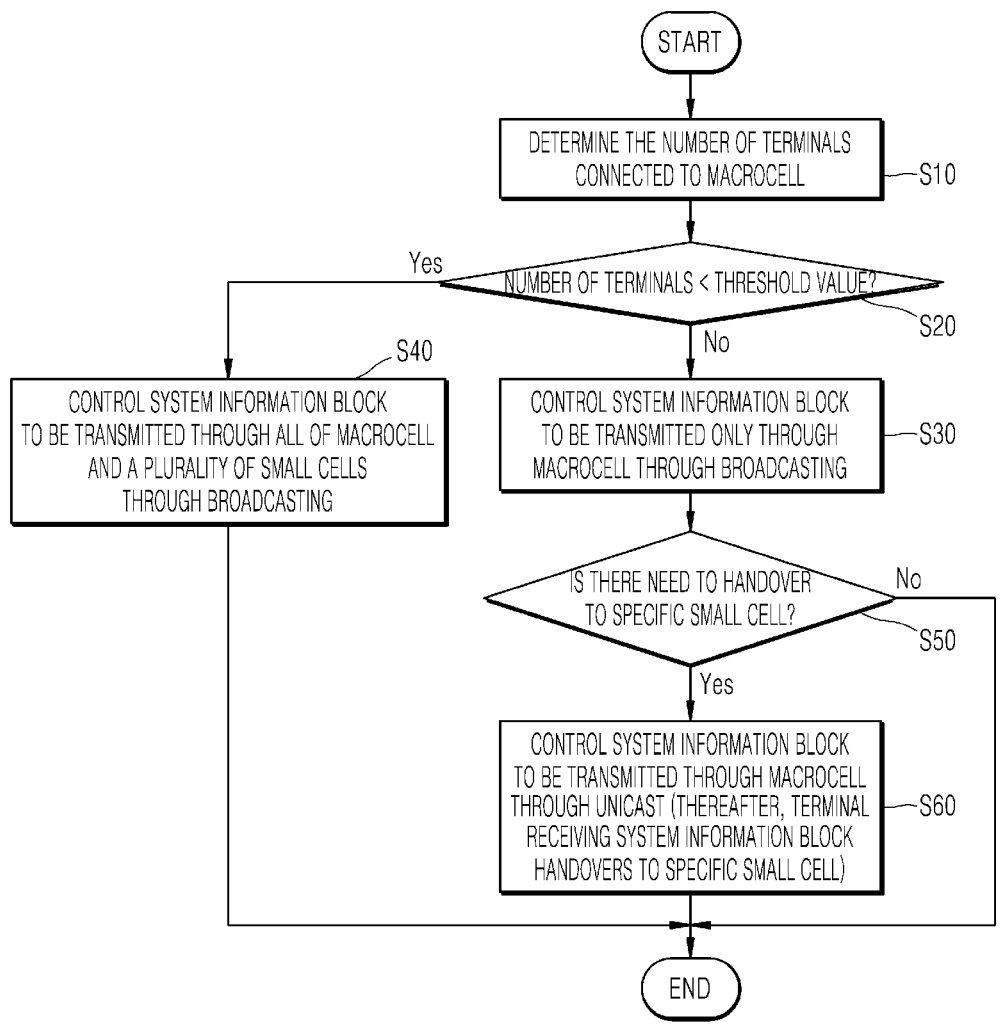
FIG. 5 is a diagram illustrating operation flow of the cell control device according to an embodiment of the present disclosure.

The operation flow of the cell control device 10 according to an embodiment of the present disclosure is described hereafter with reference to FIG. 5.

FIG. 5 is a schematic flowchart illustrating the operation flow of the cell control device 10 according to an embodiment of the present disclosure.

First, the determiner 11 determines the number of terminal connected to the macrocell MC in step S10.

The number of terminal connected to the macrocell MC can be used to selectively control whether the small cells SC1, SC2, S3, SC4, SC5, SC6, and SC7 transmit a system information block.

The determiner 11 determines whether the number of terminal connected to the macrocell MC exceeds a threshold value (for example, 40).

Next, when the number of terminal connected to the macrocell MC is determined, the controller 12 controls transmission of system information block in a broadcast manner from the macrocell MC and the small cells SC1, SC2, S3, SC4, SC5, SC6, and SC7 on the basis of the determined number of terminal.

When the number of terminal connected to the macrocell MC is determined as being less than the threshold value (for example, 40) in step S20, the controller 12 controls the transmitter 13 to transmit a system information block to the macrocell MC in a broadcast manner in step S30.

In this process, the controller 12 controls the small cells SC1, SC2, S3, SC4, SC5, SC6, and SC7 not to transmit a system information block, thereby minimizing power consumption and inter-cell interference that may be caused by transmission of a system information block.

On the contrary, when the number of terminal connected to the macrocell MC is determined as being the threshold value (for example, 40) or more in step S20, the controller 12 controls the transmitter 13 to transmit a system information block to the macrocell MC in a broadcast manner and also controls the small cells SC1, SC2, S3, SC4, SC5, SC6, and SC7 to transmit a system information block in a broadcast manner in step S40.

Further, when a terminal connected to the macrocell MC needs to handover to a specific small cell in step S50, the controller 12 controls the transmitter 13 to transmit a system information block through the macrocell MC in a unicast manner so that the terminal receiving the system information block can handover to the specific small cell in step 60.

For example, when at least one of the downlink load or the uplink load of the macrocell MC exceeds threshold value and the reference signal reception power (for example, RSRP/RSRQ) of the specific small cell reported from a terminal connected to the macrocell MC exceeds threshold value, the controller 12 can determine that there is a need to handover to the specific cell.

The system information block transmitted in a unicast manner is transmitted through a radio resource control (RRC) connection reconfiguration message Control information (connection information) associated with connection to the specific small cell can be included in the system information block.

As described above, according to the operation flow of the cell control device 10 according to an embodiment of the present disclosure, it is possible to reduce or block transmission of the system information block (SIB) in a wireless environment where a plurality of small cells SC1, SC2, SC3, SC4, SC5, SC6, and SC7 is included in the macrocell MC, thereby removing inter-cell interference due to transmission of system information and improving data transmission efficiency.

Meanwhile, the method described in connection with the provided embodiments or steps of the algorithm may be implemented in a form of a program command, which can be executed through various computer means, and recorded in a computer-readable recording medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A cell control device comprising:
   a determiner configured to determine the number of terminal connected to a macrocell in a wireless environment including a plurality of small cells in the macrocell; and
   a controller configured to control each of the plurality of small cells to block transmission of system information block in a broadcast manner and the macrocell to perform transmission of system information block in a broadcast manner when the number of terminal is less than a threshold value, and to control the each of the plurality of small cells and the macrocell to perform transmission of system information block in a broadcast manner when the number of terminal is the threshold value or more.

2. The cell control device of claim 1, wherein the controller is configured to, when it is determined that there is a need to handover the terminal connected to the macrocell to a specific small cell, allow transmission of system information block related to the specific small cell from the macrocell in a unicast manner, so that the terminal receiving the system information block is able to handover to the specific small cell.

3. The cell control device of claim 2, wherein the controller is configured to determine there is a need to handover to the specific small cell, when at least one of a downlink load and an uplink load of the macrocell exceeds a threshold value and reference signal received power of the specific small cell reported from the terminal exceeds a threshold value.

4. The cell control device of claim 2, wherein the system information block transmitted in a unicast manner includes control information for connection to the specific small cell.

5. The cell control device of claim 2, wherein the system information block transmitted in a unicast manner is transmitted through a radio resource Control (RRC) message including an RRC connection reconfiguration message.

6. A cell control method comprising:
   determining the number of terminal connected to a macrocell in a wireless environment including a plurality of small cells in the macrocell; and
   controlling each of the plurality of small cells to block transmission of system information block in a broadcast manner and the macrocell to perform transmission of system information block in a broadcast manner when the number of terminal is less than a threshold value, and the each of the plurality of small cells and the macrocell to perform transmission of system information block in a broadcast manner when the number of terminal is the threshold value or more.

7. The cell control method of claim 6, wherein the operation of controlling comprises:
   when it is determined that there is a need to handover the terminal connected to the macrocell to a specific small cell, allowing transmission of system information block related to the specific small cell from the macrocell in a unicast manner, so that the terminal receiving the system information block is able to handover to the specific small cell.

8. The cell control method of claim 7, wherein it is determined there is a need to handover to the specific small cell, when at least one of a downlink load and an uplink load of the macrocell exceeds a threshold value and reference signal received power of the specific small cell reported from the terminal exceeds a threshold value.

9. The cell control method of claim 7, wherein the system information block transmitted in a unicast manner includes control information for connection to the specific small cell.

10. The cell control method of claim 7, wherein the system information block transmitted in a unicast manner is transmitted through a radio resource control (RRC) message including an RRC connection reconfiguration message.

* * * * *